(12) United States Patent
Niu et al.

(10) Patent No.: US 10,185,377 B2
(45) Date of Patent: Jan. 22, 2019

(54) HEAT DISSIPATION METHOD AND ELECTRONIC DEVICE USING THE SAME

(71) Applicant: ASUSTeK COMPUTER INC., Taipei (TW)

(72) Inventors: Chia-Ching Niu, Taipei (TW); Ing-Jer Chiou, Taipei (TW); Cheng-Yu Wang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 281 days.

(21) Appl. No.: 14/981,946

(22) Filed: Dec. 29, 2015

(65) Prior Publication Data

US 2016/0202740 A1 Jul. 14, 2016

(30) Foreign Application Priority Data

Jan. 12, 2015 (TW) .............................. 104100971 A

(51) Int. Cl.
*G06F 1/20* (2006.01)
*G01K 1/14* (2006.01)
*G05B 15/02* (2006.01)

(52) U.S. Cl.
CPC ............. *G06F 1/206* (2013.01); *G01K 1/14* (2013.01); *G05B 15/02* (2013.01)

(58) Field of Classification Search
CPC ............ G01K 1/14; G05B 15/02; G06F 1/206
See application file for complete search history.

(56) References Cited

U.S. PATENT DOCUMENTS

| | | | | |
|---|---|---|---|---|
| 9,328,946 | B2* | 5/2016 | Chen | F25B 30/02 |
| 9,999,162 | B2* | 6/2018 | Chen | H05K 7/20172 |
| 2003/0146205 | A1* | 8/2003 | Rael | F24C 15/16 |
| | | | | 219/506 |
| 2004/0233663 | A1* | 11/2004 | Emslie | H05B 41/2828 |
| | | | | 362/221 |
| 2008/0303466 | A1 | 12/2008 | Eto | |
| 2012/0090337 | A1* | 4/2012 | Chen | F25B 30/02 |
| | | | | 62/79 |
| 2014/0079533 | A1* | 3/2014 | Kitano | H05K 7/20136 |
| | | | | 415/1 |
| 2014/0117908 | A1* | 5/2014 | Busch | H02P 1/04 |
| | | | | 318/471 |
| 2014/0304541 | A1 | 10/2014 | Das et al. | |

FOREIGN PATENT DOCUMENTS

| | | |
|---|---|---|
| CN | 201270474 Y | 7/2009 |
| CN | 103777724 A | 5/2014 |
| TW | 201005492 A | 2/2010 |
| TW | 201426271 A | 7/2014 |

* cited by examiner

*Primary Examiner* — Kenneth M Lo
*Assistant Examiner* — Chad G Erdman
(74) *Attorney, Agent, or Firm* — CKC & Partners Co., Ltd.

(57) ABSTRACT

A heat dissipation method applied to an electronic device including an electronic component is provided. The heat dissipation method includes: sensing a temperature of an electronic component by the temperature sensor; determining whether the temperature of the electronic component is larger than a threshold temperature; determining a rotation speed rank corresponding to a basic rotation speed and intermittently accelerating the basic rotation speed in the rotation speed rank while the sensed temperature of the electronic device is larger than a threshold temperature.

10 Claims, 4 Drawing Sheets

HEAT DISSIPATION METHOD AND ELECTRONIC DEVICE USING THE SAME

CROSS-REFERENCE TO RELATED APPLICATION

This application claims the priority benefit of Taiwan application serial No. 104100971, filed on Jan. 12, 2015. The entirety of the above-mentioned patent application is hereby incorporated by reference herein and made a part of specification.

BACKGROUND OF THE INVENTION

Field of the Invention

The disclosure relates to a heat dissipation method and more particular to a heat dissipation method for an electronic device.

Description of the Related Art

Generally, electronic components of an electronic device generate heat in operating. While the operation component is overheated, an operational error is easily generated to cause the electronic device to crash. Conventionally various heat dissipation devices, such as a fan, are disposed in the electronic device to cool the operation components. However, the fan usually generates big noise in operating that cause users to feel discomfort.

BRIEF SUMMARY OF THE INVENTION

According to a first aspect of the present disclosure, an electronic device including an electronic component, comprising a fan module configured to cool the electronic component; a temperature sensor configured to sense a temperature of the electronic component; and a fan controller electrically connected to the temperature sensor and the fan module, wherein while the temperature of the electronic component sensed by the temperature sensor is larger than a threshold temperature, the fan controller determines a rotation speed rank corresponding to a basic rotation speed, and the basic rotation speed is intermittently accelerated on the rotation speed rank.

Furthermore, according to a second aspect of the present disclosure, a heat dissipation method applied to an electronic device including an electronic component, comprising sensing a temperature of the electronic component by a temperature sensor; and determining a rotation speed rank corresponding to a basic rotation speed and intermittently accelerating the basic rotation speed in the rotation speed rank while the sensed temperature of the electronic device is larger than a threshold temperature.

DETAILED DESCRIPTION OF THE EMBODIMENTS

Figure 1:
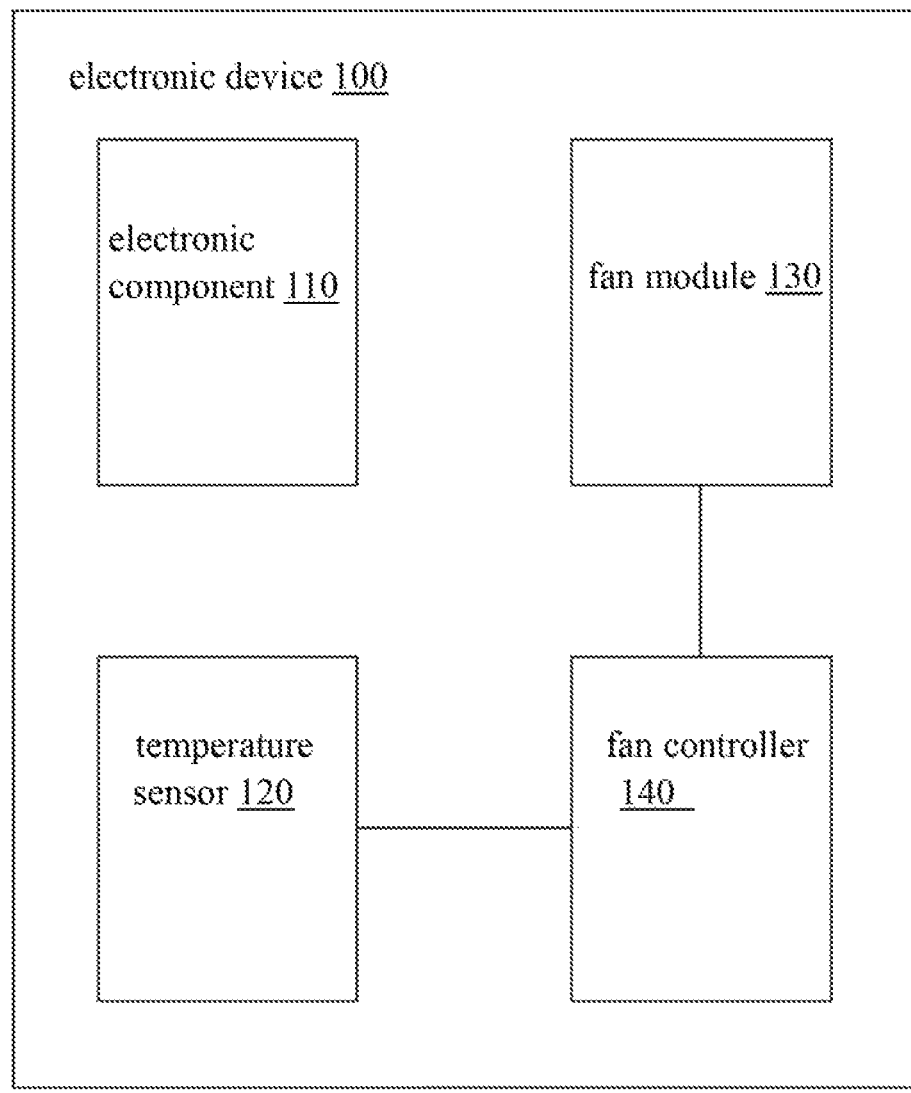
FIG. 1 is a block diagram showing an electronic device in an embodiment.

FIG. 1 is a block, diagram showing an electronic device 100 in an embodiment. In the embodiment, the electronic device 100 includes an electronic component 110, a temperature sensor 120, a fan module 130 and a fan controller 140. The fan controller 140 is electrically connected to the temperature sensor 120 and the fan module 130.

In the embodiment, the electronic component 110 which can be easily to venerate heat in the electronic device 100, in an embodiment the electronic component is a CPU (Central Processing Unit) or a GPU (Graphics Processing unit), which is not limited herein. The fan module 130 includes at least one fan. In an embodiment, the fan controller 140 is an embedded controller or another computer component, which is not limited herein.

The temperature sensor 120 senses the temperature of the electronic component 110. The fan module 130 cools the electronic component 110. The fan controller 140 controls the operation state of the fan module 130 according to the temperature of the electronic component 110 to cool the electronic component 110.

Figure 2:
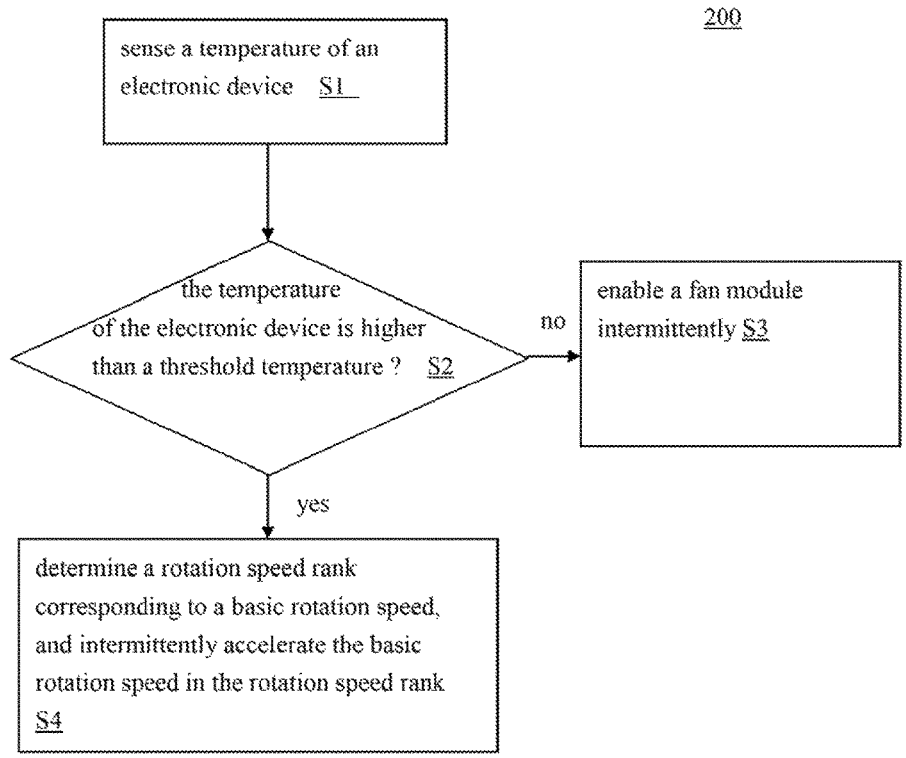
FIG. 2 is a flow chart showing a heat dissipation method for an electronic device in an embodiment.

The disclosure is illustrated with a dissipation method for the electronic device in FIG. 2 to provide further details, which is not limited herein.

FIG. 2 is a flow chart showing a dissipation method 200 for an electronic device in an embodiment. The dissipation method 200 is applied to a same or a similar electronic device as shown in FIG. 1. The dissipation method is illustrated with the electronic device 100 in FIG. 1 as an example, which is not limited herein.

The sequence of steps mentioned in the dissipation method, except particularly emphasized, can be adjusted according to practical demands, even can be executed simultaneously or partial simultaneously. The steps in different embodiments can be added, replaced, and/or omitted adaptively.

The dissipation method 200 in the embodiment includes the following steps.

In step S1, the temperature sensor 120 of the fan controller 140 senses the temperature of the electronic component 110.

In step S2, the fan controller 140 determines whether the temperature of the electronic component 110 is larger than a threshold temperature, if no, step S3 is executed; if yes, step S4 is executed.

In step S3, while the temperature of the electronic component 110 is lower than a threshold temperature, the fan controller enables the fan module 130 intermittently to cool the electronic, component 110.

Figure 3:
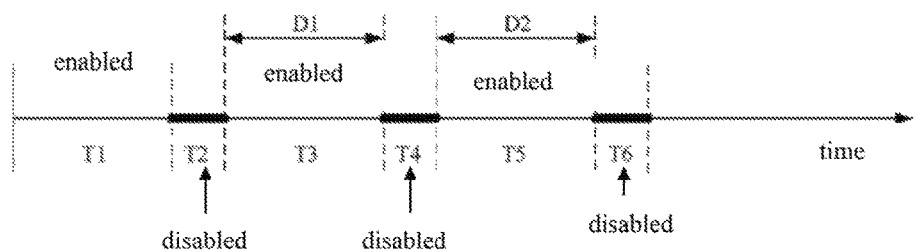
FIG. 3 is a schematic diagram showing a heat dissipation method for an electronic device in an embodiment.

In an embodiment, please refer to FIG. 3, in period T1, the fan controller 140 maintains the fan module 130 off. In period T2, the fan controller 140 enables the fan module 130. In period T3, the fan controller 140 disables the fan module 130. In period T4, the fan controller 140 enables the fan module 130. In period T5, the fan controller 140 disables the fan module 130. In period T6, the fan controller 130 enables the fan module 140. The fan module 130 is enabled in periods T2, T4, and T6 to cool the electronic component 110, and thus the electronic component 110 is cooled with low noise.

In an embodiment, in contrast to the noise generated by the fan module 130 in a disabled period (such as T1, T3, T5), the increased noise generated by the fan module 130 in an enabled period (such as T2, T4, T6) is less than a threshold value (such as 3 db) sensible by a human ear.

The noise generated by the fan module 130 is measured by a microphone in a specific test environment. In an embodiment, the test environment is a silent room including an ISO7770 (International Standardization Organization 7770) test table. The test table is disposed in the center of the silent room. The electronic device 100 is disposed on the test table. The microphone is disposed beside the test table about 25 centimeters from the electronic device 100. The electronic device 100 includes different operation states, in an embodiment, the electronic device 100 is coupled with other accessories (such as a base) or operates independently, which is not limited herein.

In an embodiment, the fan controller 140 enables the fin module 130 periodically, that is, the enabled periods (such as a period D1 or D2 in which the fan module 130 is enabled) are the same. Consequently, the user does not easily feel the noise while the fan module 130 is enabled. In an embodiment, the fan controller 140 enables the fan module 130 aperiodically, which is not limited, herein.

Please refer to FIG. 2, in step S4, while the temperature of the electronic component 110 is larger than a threshold temperature, the fan controller 140 enables the fan module 130 and determines the rotation speed rank of the fan module 130 according to the temperature of the electronic component 110. In an embodiment, the fan controller 140 determines that the rotation speed rank of the fan module 130 is one of preset rotation speed ranks (such as L1, L2 . . . LN). Each preset rotation speed rank is corresponding to a basic rotation speed. In the embodiment, the higher the temperature of the electronic component 110 is, the higher rotation speed rank is, and the faster basic rotation speed corresponding, to the rotation speed ranks is. The fan controller 140 determines the rotation speed rank of the fan module 130, the fan module 130 operates to cool the electronic component 110 according to a basic rotation speed (such as the basic rotation speed BS1 in FIG. 4) corresponding to the rotation speed rank (such as a rotation speed rank L1). While the fan module 130 operates in a operation period of the basic rotation speed, in an embodiment, the tan controller 140 further intermittently accelerates the basic rotation speed of the fan module 130 larger than or equal to two times to increase heat dissipation effect of the fan module 130 to cool the electronic component 110. That is, the fan module 130 is temporarily accelerated to an accelerated rotation speed from the basic rotation speed. In other words, the fan controller 140 intermittently accelerates the basic rotation speed in the rotation speed rank.

Figure 4:
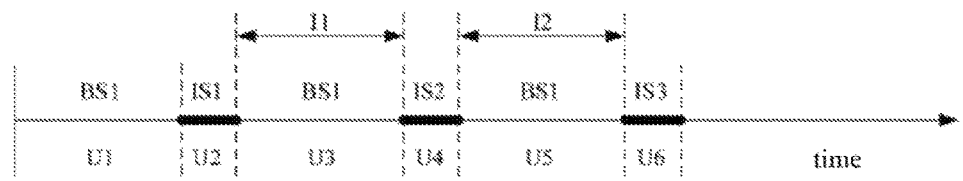
FIG. 4 is a schematic diagram showing a beat dissipation method for an electronic device in an embodiment.

In an embodiment, please refer to FIG. 4, in period U1, the fan controller 140 controls the fan module 130 at the basic rotation speed BS1 corresponding to the rotation speed rank L1. In period U2, the fan controller 140 controls the fan module 130 to operate in the accelerated rotation speed IS1. In period U3, the fan controller 140 controls the fan module 130 to restore in the basic rotation speed BS1 corresponding to the rotation speed rank L1. In period U4, the fan controller 140 controls the fan module 130 to operate in the accelerated rotation speed IS2. In period U5, the fan controller 140 controls the fan module 130 to restore in the basic rotation speed BS1 corresponding to the rotation speed rank L1. In period U6, the fan controller 140 controls the fan module 130 to operate in the accelerated rotation speed IS3.

The fan controller 140 controls the fan module 130 to circularly accelerate from a basic rotation speed BS1 corresponding to the rotation speed rank L1 to an accelerated rotation speed IS1, IS2, or IS3 and then to restore to the basic rotation speed BS1 corresponding to the rotation speed rank L1.

As operations above, the fin module 130 is only accelerated momently in periods U2, U4 U6, and thus the noise is low in cooling the electronic component 110.

In an embodiment, in contrast to the noise generated by the fan module 130 operating in a basic rotation speed BS1 period (such as U1, U3, U5), the increased noise generated by the fan module 130 in an accelerating period (such as U2, U4, U6) is less than a threshold value (such as 3 db) sensible by a human ear. In an embodiment, the noise generated by the fan module 130 is measured in the silent room.

In an embodiment, the fan controller 140 controls the fan module 130 to accelerate periodically, that is the time intervals (such as time intervals I1, I2) in adjacent two accelerations to the fan module 130 are the same. In this configuration, the user does not easily sense the noise while the fan module 130 is accelerated, in an embodiment, the fan controller 140 controls the fan module 130 to accelerates aperiodically, which is not limited herein.

In an embodiment, the accelerated rotation speeds IS1, IS2, IS3 of the fan module 130 in the accelerating periods (such as U2, U4, U6) are the same or different. In an embodiment, the fan controller 140 determines an accelerated range (that is the value of the accelerated rotation speed IS1, IS2, or IS3 minus the basic rotation speed BS1) to the fan module 130 and a time interval between adjacent accelerations (such as I1, I2) according to the temperature of the electronic component 110. In an embodiment, the fan controller 130 determines the accelerated range to the fan module 130 and a time interval between adjacent accelerations according to a current rotation speed rank.

Figure 5:
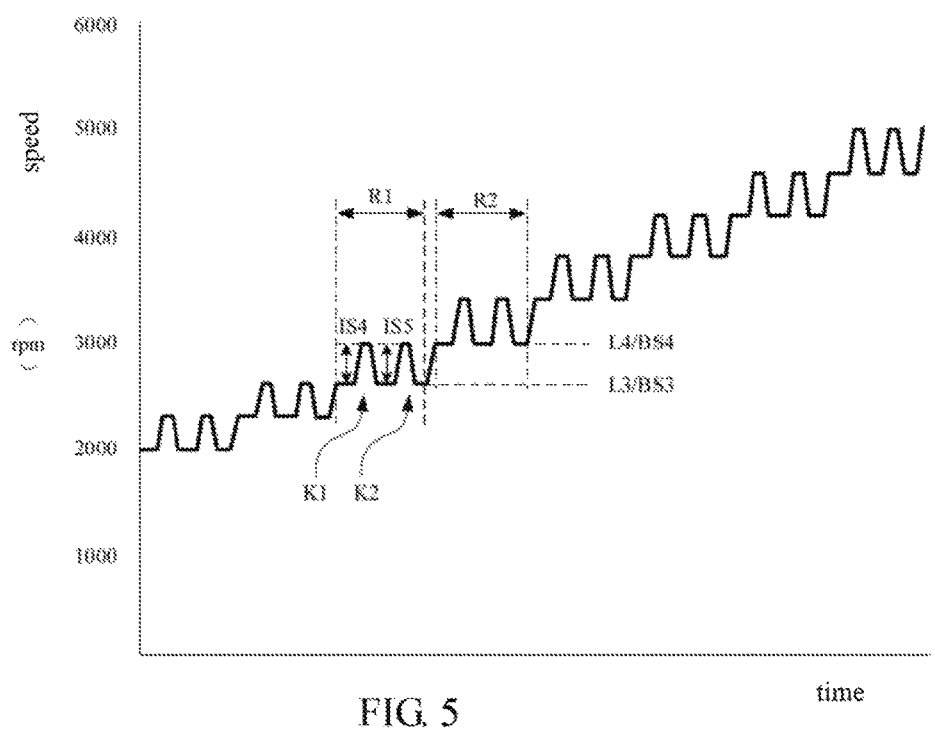
FIG. 5 is a schematic diagram showing a heat dissipation method for an electronic device in an embodiment.

Please refer to FIG. 5, in an embodiment, in period R1, the fan controller 140 determines that the rotation speed rank of the fan module 130 is the rotation speed rank L3 according to the temperature of the electronic component 110. The fan controller 140 controls the fan module 130 to operate in the basic rotation speed BS3 corresponding to the rotation speed rank L3 and the fan module 130 is accelerated in a first acceleration K1 and a second acceleration K2. In the first acceleration K1, the fan module 130 is operated in the accelerated rotation speed IS4. In the second acceleration K2, the fan module 130 is operated M the accelerated rotation speed IS5. Then, in period R2, the fan controller 140 determines the rotation speed rank of the fan module 130 is the rotation speed L4 according to the temperature of the electronic component 110. The fan controller 140 controls the fan module 130 to operate in the basic rotation speed BS4 corresponding to the rotation speed rank L4 and the fan module 130 is accelerated larger than or equal to two times.

In the embodiment, the accelerated rotation speeds IS4, IS5 are the same or different. In an embodiment, the accelerated rotation speeds IS4, IS5 are less than or equal to the basic rotation speed BS4 of next rotation speed rank. In contrast to the noise generated in the basic rotation speed BS3, the increased noise by the fan module 130 in the accelerated rotation speed IS4 and IS5 is less than 3 db.

Figure 6:
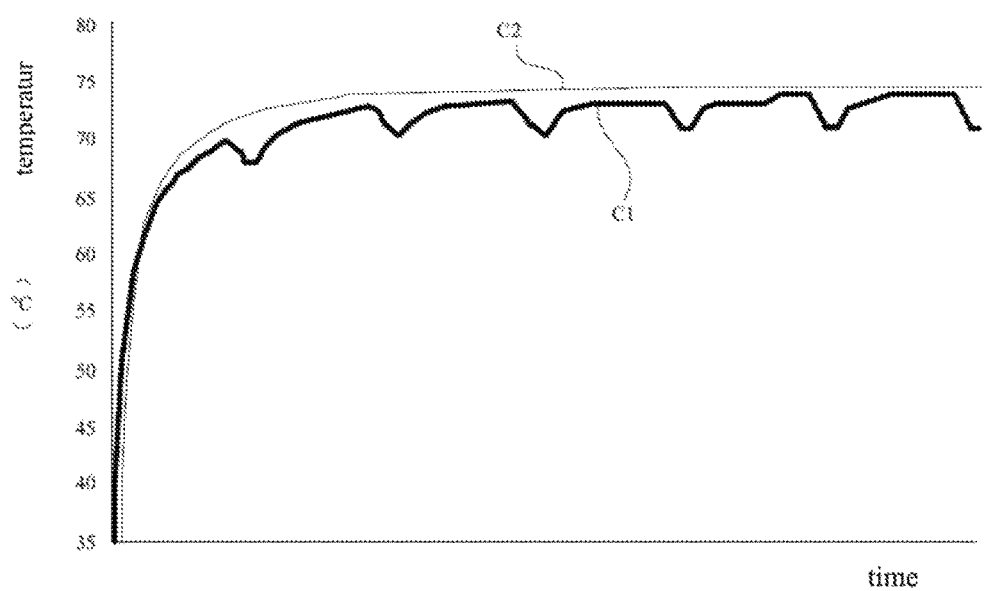
FIG. 6 is a schematic diagram showing a temperature comparison between an electronic device and a conventional electronic device in an embodiment.

FIG. 6 is a schematic diagram showing temperature comparison of an electronic device 100 and a conventional electronic device in an embodiment. A curve C1 represents temperatures of the electronic device 100. A curve C2 represents temperatures of the conventional electronic device. The temperature of the electronic device 100 is lower than the temperature of the conventional electronic device.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device including an electronic component, comprising:
   a fan module configured to lower a temperature of the electronic component;
   a temperature sensor configured to sense the temperature of the electronic component; and
   a fan controller electrically connected to the temperature sensor and the fan module to determine a rotation speed rank from a plurality of rotation speed ranks according to the temperature of the electronic component, wherein each of rotation speed ranks corresponds to a temperature range and has a corresponding basic rotation speed that is a lowest rotation speed of the fan module in the temperature range;
   wherein while the temperature of the electronic component sensed by the temperature sensor is in the temperature range of higher than a first threshold temperature and lower than a second threshold temperature, the fan controller determines a first rotation speed rank from the rotation speed ranks and controls the fan module to rotate at the corresponding basic rotation speed, a first rotation speed of the first rotation speed rank in a first period, and
   while the temperature of the electronic component sensed by the temperature sensor is still in the temperature range, the fan controller controls the fan module to rotate at a second rotation speed in a second period after the first period,
   and while the temperature of the electronic component sensed by the temperature sensor is still in the temperature range, the fan controller controls the fan module to rotate at the first rotation speed in a third period after the second period when the first rotation speed rank is determined from the rotation speed ranks,
   wherein the second rotation speed is higher than the first rotation speed, and the second rotation speed is not higher than the corresponding basic rotation speed of a second rotation speed rank following the first rotation speed rank.

2. The electronic device to claim 1, wherein while a temperature of the electronic component is less than the first threshold temperature, the fan controller enables the fan module in the first period, disables the fan module in the second period, enables the fan module again in the third period and disables the fan module again in the fourth period.

3. The electronic device to claim 1, wherein while the temperature of the electronic component sensed by the temperature sensor is higher than the first threshold temperature and is lower than the second threshold temperature, the fan controller further controls the fan module to rotate at the second rotation speed in a fourth period after the third period when the first rotation speed rank is determined from the rotation speed ranks the fan controller determines a length of the second period and a length of the fourth period.

4. The electronic device to claim 3, wherein the length of the second period and the length of the fourth period are the same.

5. A heat dissipation method applied to an electronic device including an electronic component comprising:
   sensing a temperature of the electronic component by a temperature sensor;
   determining a rotation speed rank from a plurality of rotation speed ranks according to the temperature of the electronic component, wherein each of rotation speed ranks corresponds to a temperature range and has a corresponding basic rotation speed that is a lowest rotation speed of the fan module in the temperature range; and
   while the temperature of the electronic device sensed by the temperature sensor is in the temperature range of higher than a first threshold temperature and lower than a second threshold temperature, determining a first rotation speed rank from the rotation speed ranks and controlling a fan module to rotate at the corresponding basic rotation speed, a first rotation speed, of the first rotation speed rank in a first period, and
   while the temperature of the electronic component sensed by the temperature sensor is still in the temperature range, controlling the fan module to rotate at a second rotation speed in a second period after the first period, and
   while the temperature of the electronic component sensed by the temperature sensor is still in the temperature range, controlling the fan module to rotate at the first rotation speed in a third period after the second period when the first rotation speed rank is determined from the rotation speed ranks,
   wherein the second rotation speed is higher than the first rotation speed, and the second rotation speed is not higher than the corresponding basic rotation speed of a second rotation speed rank following the first rotation speed rank.

6. The heat dissipation method to claim 5, further comprising:
   while the temperature of the electronic component is less than the first threshold temperature, enabling the fan module in the first period, disabling the fan module in the second period, enabling the fan module again in the third period, and disabling the fan module again in the fourth period.

7. The heat dissipation method to claim 5, further comprising:
   while the temperature of the electronic device is higher than the first threshold temperature and is lower than the second threshold temperature, controlling the fan module to rotate at the second rotation speed in a fourth period after the third period when the first rotation speed rank is determined from the rotation speed ranks.

8. The heat dissipation method to claim 7, wherein the length of the second period and the length of the fourth period are the same.

9. The heat dissipation method to claim 7, wherein the step of controlling the fan module to rotate at the second rotation speed in the fourth period after the third period when the first rotation speed rank is determined from the rotation speed ranks comprising:
   determining a length of the fourth period according to the temperature of the electronic component.

10. The heat dissipation method to claim 5, wherein the step of controlling the fan module to rotate at the second rotation speed in the second period after the first period when the first rotation speed rank is determined from the rotation speed ranks comprising:

determining a length of the second period according to the temperature of the electronic component.

* * * * *